US006574186B2

United States Patent
Nii et al.

(12) United States Patent
(10) Patent No.: US 6,574,186 B2
(45) Date of Patent: Jun. 3, 2003

(54) ASSEMBLY METHOD OF MOTOR USING MAGNETIC LUBRICATION FLUID (75) Inventors: Katsutoshi Nii, Hitachi (JP); Toshikazu Takehana, Edosaki (JP); Motohiro Miyasaka, Nagareyama (JP)

(73) Assignees: Hitachi, Ltd., Tokyo (JP); Hitachi Powdered Metals co., Ltd., Matsudo (JP)

( * ) Notice: Subject to any disclaimer, the term of this patent is extended or adjusted under 35 U.S.C. 154(b) by 209 days.

(21) Appl. No.: 09/725,875

(22) Filed: Nov. 30, 2000

(65) Prior Publication Data

US 2001/0002898 A1 Jun. 7, 2001

(30) Foreign Application Priority Data

Dec. 1, 1999 (JP) .......................... 11-341701

(51) Int. Cl.[7] .............................. G11B 05/52
(52) U.S. Cl. ........................ 369/269; 310/90
(58) Field of Search ................ 310/90, 42, 67 R; 384/133; 360/99.08, 98.08, 98.07, 99.04; 141/7, 5; 29/603.03, 598; 369/269

(56) References Cited

U.S. PATENT DOCUMENTS

| 4,490,759 A | * | 12/1984 | Maruyama | 360/130.24 |
|---|---|---|---|---|
| 4,526,484 A | * | 7/1985 | Stahl et al. | 384/133 |
| 5,134,331 A | * | 7/1992 | Miyaji et al. | 310/90 |
| 5,524,728 A | * | 6/1996 | Williams et al. | 184/29 |
| 5,601,125 A | * | 2/1997 | Parsoneault et al. | 141/82 |
| 5,723,927 A | * | 3/1998 | Teshima | 310/67 R |
| 5,778,948 A | * | 7/1998 | Gomyo et al. | 384/133 |
| 5,822,846 A | * | 10/1998 | Moritan et al. | 310/90 |
| 5,885,005 A | * | 3/1999 | Nakano et al. | 384/113 |
| 5,894,868 A | * | 4/1999 | Wuester | 141/7 |

FOREIGN PATENT DOCUMENTS

JP 04006667 * 1/1992 ........... G11B/19/20

* cited by examiner

Primary Examiner—William Korzuch
Assistant Examiner—Christopher R Beacham
(74) Attorney, Agent, or Firm—Antonelli, Terry, Stout & Kraus, LLP

(57) ABSTRACT

A conventional plain bearing, in which dynamic pressure is generated by means of lubricating oil, has been assembled in such a way that the whole bearing device is assembled and then the lubricating oil is poured in the interior. As a result, residual air bubbles are produced to cause lowering of the dynamic pressure. The present invention uses magnetic fluid as lubricating oil, and adopts, for enclosing the fluid, a method in which at the time of assembling a spindle motor, a permanent magnet is used, magnetic fluid of a specified amount is previously held in a bearing unit by the magnetic attraction force, and after the insertion of a shaft, the magnetic fluid is supplied into a narrow space of a bearing part by a capillary attraction.

4 Claims, 6 Drawing Sheets

ASSEMBLY METHOD OF MOTOR USING MAGNETIC LUBRICATION FLUID

BACKGROUND OF THE INVENTION

The present invention relates to a spindle motor for use in magnetic disk devices, optical disk devices and the like, and more particularly to a method of assembling a plain bearing unit suitable for accuracy and high speed rotation and coping with mass production.

Recently, a disk driving spindle motor for use in magnetic disk devices and optical disk devices is required to have the performance of high speed and accurate rotation. A motor employing a conventional ball bearing has a limit in the performance of high speed and accurate rotation when improving the machining accuracy, lubrication and sound noise of the ball bearing. And, a motor on which a hydrodynamic plain bearing is mounted has been proposed and brought into practical use. As a hydrodynamic plain bearing, JP-A-10-73126 and JP-A-8-80091 disclose a hydrodynamic groove bearing that has a bearing surface formed with shallow grooves for generating a dynamic pressure. Furthermore, JP-A-9-303398 and JP-A-11-96658 disclose a bearing unit using a three lobe bearing with a bearing surface comprising circular arc surfaces that have a dynamic pressure generating function.

It is necessary for a motor using the above described hydrodynamic bearing to suppress the axial shake to one $\mu$m to sub $\mu$m or less in order to keep the accurate rotation. For this, a shaft with a high bearing rigidity is required, and it is necessary to adopt a hydrodynamic bearing.

This hydrodynamic bearing, in the case of the hydrodynamic groove bearing, has a plurality of shallow grooves of several $\mu$m are provided in its bearing surface in order to maintain the bearing rigidity and generates a dynamic pressure on the bearing surface through the pumping action due to the rotation of a shaft to attain its object. In the case of the three lobe bearing, a space defined between a shaft and the bearing surface is formed in a wedge-like shape, and the bearing generates a dynamic pressure through the wedge action of an oil film, while maintaining the bearing rigidity. In either bearing, in order to raise the bearing rigidity, the space between the shaft and the bearing surface has a size on the order of $\mu$m. Furthermore, it is necessary for keeping the bearing rigidity thus designed to surely enclose lubricating oil in the bearing part.

However, it is impossible to easily enclose the lubricating oil in such a narrow space without containing any air bubbles. In view of this, JP-A-10-73126 takes a measure of once putting an assembled motor in a vacuum chamber and enclosing lubricating oil by utilizing a capillary attraction or the external atmospheric pressure while evacuating the interior of the machine. By this method, it becomes possible to fill the interior of the bearing with lubricating oil in the state of a low air content, but no concrete enclosing method is described. More specifically, this type of motor is answerable to the mass production and is also related to the production cost. Therefore, the enclosing method of lubricating oil is a key technique in the manufacturing of the motor. When the lubricating oil is poured in the state where the interior of the machine is merely evacuated, there is a possibility that air bubbles dissolved in the lubricating oil will expand into a popping state. The above described reference fails to describe how to pour oil while preventing its popping.

The embodiment disclosed in JP-A-8-80091 takes a measure of providing in the shaft a lubricating oil supply hole for supplying the lubricating oil into the interior of the bearing, but it fails to describe any measure for surely removing air bubbles. Similarly to the above described embodiment, there is specifically described no concrete method for filling the interior of the bearing with lubricating oil in the state of a low air content.

As concerns the embodiment disclosed in JP-A-9-303398, description has been made on the amount of oil enclosed, but as for the inclusion of air bubbles, no description is given, and as for the removal of air bubbles in the bearing unit or the like, there is also no consideration.

In the embodiment disclosed in JP-A-11-96658, there is described a structure for using magnetic fluid as lubricating oil and magnetizing the bearing and the shaft to hold the lubricating oil on the bearing surface. But, no description is made concerning any method of supplying the magnetic fluid and the inclusion of air bubbles, and there is also no consideration as for the removal of air bubbles in the bearing unit.

BRIEF SUMMARY OF THE INVENTION

The present invention has been accomplished in view of the defects of the prior art above described. It is an object of the invention to provide an oiling method for a bearing unit, which surely feeds lubricating oil with little air content to a bearing unit of a disk driving motor or the like, and which can cope with mass production motors.

According to the invention, as means for attaining the above object, magnetic fluid is used as lubricating oil in a motor using a hydrodynamic bearing. And, as the first concrete enclosing method, the magnetic fluid of a specified amount is introduced and held in the bearing unit by arranging a permanent magnet outside the bearing unit before inserting a shaft therein and by using the magnetic attraction force. The shaft is then inserted, and after that, the magnetic fluid is supplied into the narrow space of the above described bearing part by a capillary attraction. By this lubricating oil enclosing method, not only the magnetic fluid can be held in the bearing part by the magnetic attraction force and the surface tension in the bearing space, but also air bubbles can be removed from the magnetic fluid by the difference in density between the magnetic fluid and the air. Accordingly, after that, the permanent magnet for attraction of the magnetic fluid is removed to release the magnetic attraction force acting on the magnetic fluid, and the motor is assembled.

The second concrete enclosing method is as follows. It is different from the first method in that a permanent magnet for holding the magnetic fluid is arranged between radial bearings. Besides, the permanent magnet provided outside the bearing unit has a magnetic force larger than that of the permanent magnet for holding the magnetic fluid. By this method, it is possible to surely hold the magnetic fluid in the bearing part by the magnetic attraction force of the magnetic fluid holding permanent magnet after the enclosing of the magnetic fluid.

The third concrete enclosing method is the same as the first method and the second method in that magnetic fluid is used as lubricating oil. In this method, the magnetic fluid of a predetermined amount is previously held by an magnetic attraction force on a thrust bearing, which serves as a member for closing one end of the bearing unit, or on a cover (non-magnetic material), and the thrust bearing or the cover is attached after incorporating a radial bearing and a rotary shaft into the bearing unit. After that, the magnet provided on the thrust bearing side is removed to release the magnetic attraction force, and the magnetic fluid is supplied in the narrow space of the bearing part.

BRIEF DESCRIPTION OF THE SEVERAL VIEWS OF DRAWING

The above and other features and advantages will be apparent from the following description that will be made on the embodiments of the invention with reference to accompanying drawings, in which.

DETAILED DESCRIPTION OF THE INVENTION

Embodiments of the present invention will be described below with reference to drawings in terms of a magnetic disk driving motor.

Figure 1:
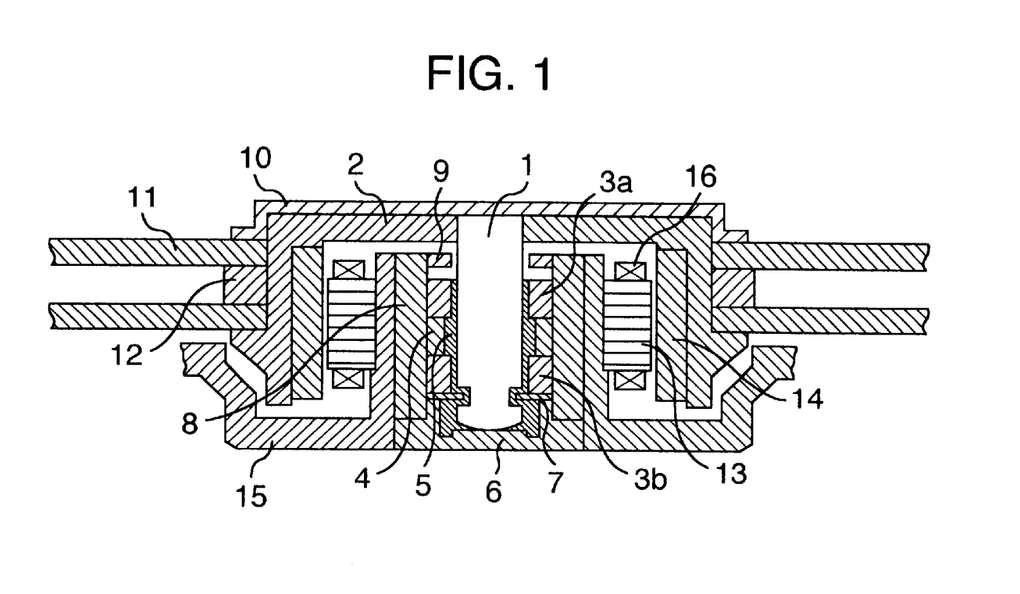
FIG. 1 is a vertical section view of a magnetic disk drive device to which the invention is applied.

FIG. 1 is a vertical section view of a magnetic disk device to which the assembly method of a bearing unit according to the invention is applied.

On a peripheral side of a hub 2 to which a shaft 1 is fixed, a plurality of magnetic disks 11 are secured by a damper 10 through a spacer ring 12 between two magnetic disks. Furthermore, on an inner peripheral side of the hub 2, a multi-pole magnetic motor rotor 14 is fixed. The shaft 1 is rotatably supported by radial bearings 3a, 3b and a thrust bearing 6. The bearing unit denotes a portion where a cover 9, radial bearings 3a, 3b, a ring-like, bearing part permanent magnet 4 for holding magnetic fluid put between the radial bearings 3a, 3b, a thrust bearing 6, the shaft 1, and a flexible slip-off stopper 7 are arranged to a non-magnetic bearing housing 8. Besides, magnetic fluid 5 is enclosed in the bearing unit. To a motor case 15, the bearing unit is fixed through the bearing housing 8 and the thrust bearing 6, and furthermore, a motor stator 13 with a motor coil 16 is fixed.

The motor of this construction is a DC brushless motor, in which the hub 2 is driven by the rotational magnetic field generated when the coil 16 is energized and by the magnetic field of the multi-pole magnetic motor rotor 14.

Figure 2:
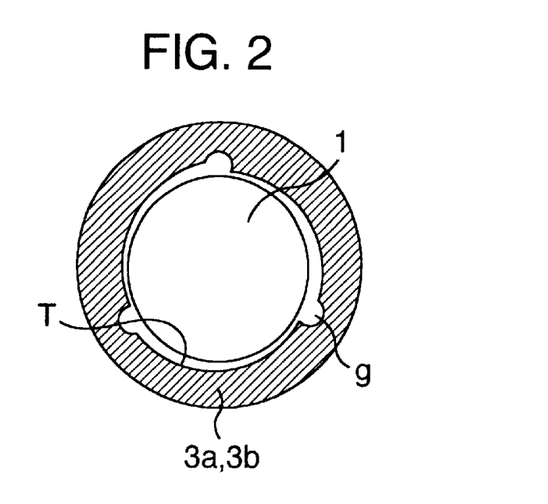
FIG. 2 is a horizontal section view of a hydrodynamic three lobe bearing.
Figure 3:
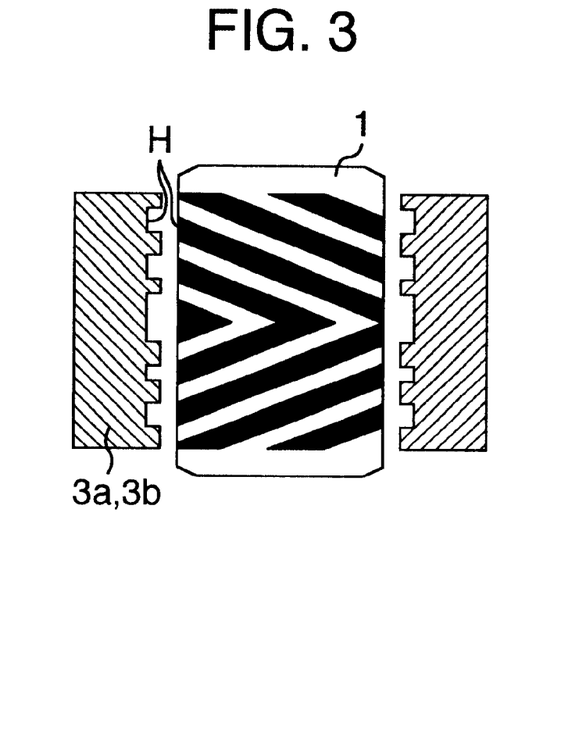
FIG. 3 is a vertical section view of a hydrodynamic groove bearing.

FIG. 2 and FIG. 3 show the radial bearings 3a or 3b used in the spindle motor shown in FIG. 1. The bearing in FIG. 2 is in the form of a three lobe bearing 3a or 3b, in which oil grooves g are formed in the radial bearing surface to provide, between the oil grooves g, as shown in the drawing, circular arc surfaces with a radius not concentric to the bearing center. In this three lobe bearing 3a or 3b, gaps or spaces T defined between the shaft 1 and the bearing surface are each shaped like a wedge, and by the wedge action of an oil film due to the rotation of the shaft 1, hydrodynamic pressure is generated, so that the shake of the shaft 1 may be suppressed. Besides, the three lobe bearing is made of a sintered material, and its inside diameter is shaped by the sizing forming process with an accuracy on the order of $\mu$m.

The bearing in FIG. 3 is in the form of a hydrodynamic groove bearing 3a or 3b, in which shallow grooves H of several $\mu$m are formed in the radial bearing surface. In this hydrodynamic groove bearing, the plurality of shallow grooves H of several $\mu$m are provided in the bearing surface, and by the pumping action due to the rotation of the shaft, dynamic pressure is generated on the bearing surface, so that the shake of the shaft 1 may be suppressed. Besides, the grooves of the groove bearing are processed by the forming of a sintered bearing or a melting material of the copper family with an accuracy on the order of $\mu$m. Accordingly, in this type of hydrodynamic bearing, a bearing space is set with an accuracy on the order of $\mu$m, and when air such as air bubbles is caught on the bearing surface, the rigidity of the bearing is significantly lowered. In the case of the motor according to the invention, the motor can be assembled, using magnetic fluid as lubricating oil, by the following method in a manner that air such as air bubbles is hardly caught on the bearing surface even when any type of bearing is used.

Figure 4:
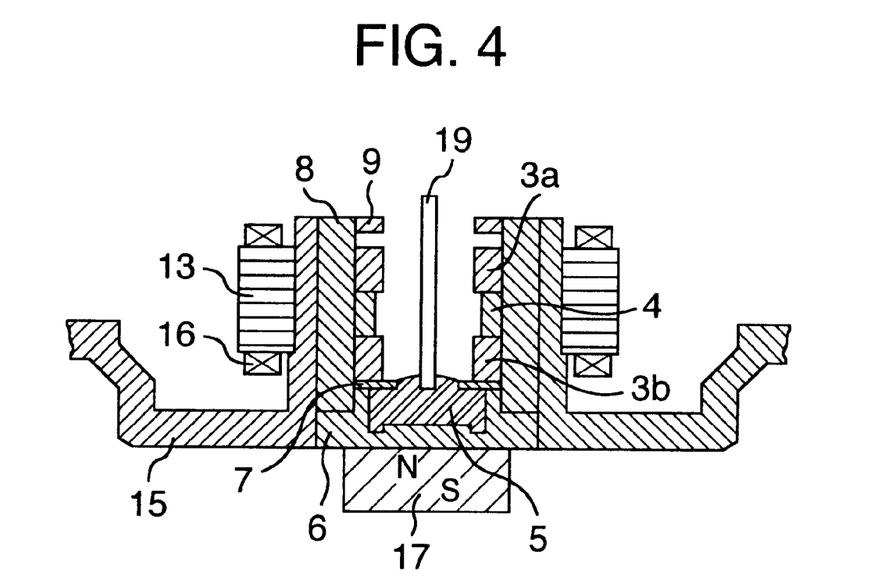
FIG. 4 is a view for explanation of a magnetic fluid enclosing method according to the invention.
Figure 5:
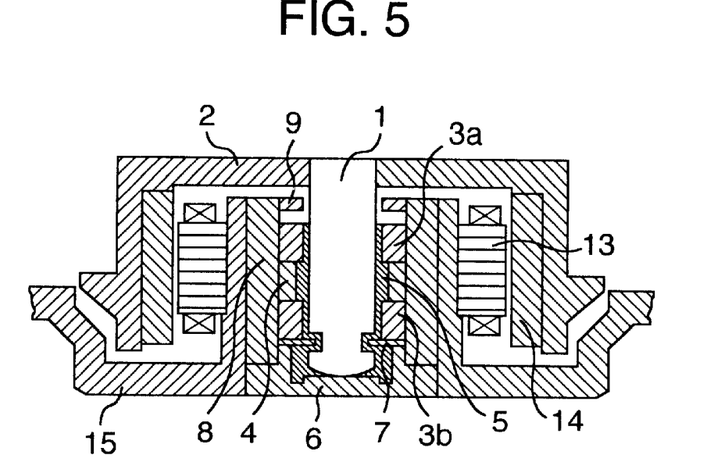
FIG. 5 is a vertical section view of a magnetic disk driving motor portion to which the invention is applied.

FIG. 4 and FIG. 5 show an embodiment of the method of enclosing magnetic fluid 5 into the bearing unit and assembling the motor according to the invention.

In the case of the spindle motor according to the invention, first, the bearing housing 8 is attached to the motor case 15 in which a motor stator and a coil are incorporated. Then, to this bearing housing 8, the thrust bearing, the slip-off stopper 7, the radial bearing 3b, the ring-shaped permanent magnet 4, which serves as the bearing part permanent magnet, the radial bearing 3a, and the cover 9 are assembled in order. Alternatively, the motor case 15 may be assembled after incorporating the above described parts to the bearing housing 8. Next, as shown in FIG. 4, in the state that rotational members of the motor such as the shaft 1 and the hub 2 are not incorporated yet, a permanent magnet 17, which serves as an external permanent magnet and exerts a magnetic attraction force larger than that of the ring-like permanent magnet 4, is arranged to the thrust bearing 6 of the bearing housing. Subsequently, the tip of a dispenser 19 is inserted up to the neighborhood of the slip-off stopper 7 from the cover 9 side, and magnetic fluid 5 of a specified amount is poured. FIG. 4 shows the state where the magnetic fluid 5 has been poured in this manner. Herein, the specified amount means an amount by which the magnetic fluid reaches the top of the radial bearing 3a of the upper part when the shaft is inserted, and this amount can be determined by previously finding the space at the time of inserting the shaft by calculation.

Then, rotational members of the motor such as the shaft 1 and the hub 2 are incorporated in the bearing unit. FIG. 5 shows the state where the above described rotational members of the motor have been incorporated in the bearing unit. When the shaft 1 is inserted into the bearing unit, the magnetic fluid 5 is pushed up to the cover 9 side. Further, air in the interior of the bearing is also pressed out to the cover 9 side along with the magnetic fluid 5. At this time, the magnetic fluid 5 has been magnetized by the permanent magnet 17. Small air bubbles in the magnetic fluid 5 are less in specific gravity than the magnetic fluid 5, and although the magnetic attraction force acts on the magnetic fluid 5, the air bubbles are free from such attraction force. Accordingly, at the time of inserting the shaft, the air bubbles are discharged from the magnetic fluid 5, and substantially no air bubbles remains in the magnetic fluid 5.

In this state, when the permanent magnet 17 is removed, the magnetic attraction force acting on the magnetic fluid 5 is released, and on the bearing surfaces of the bearings 3a, 3b, the magnetic fluid 5 is held while containing only little air bubbles. According to this lubricating oil enclosing method, the magnetic fluid 5 can be held in the bearing space by the magnetic attraction force from the permanent magnet 4 arranged between the radial bearings 3a, 3b and by the surface tension in the space between the shaft 1 and the above described radial bearings.

Furthermore, when the shaft 1 made of a magnetic material is used, in this embodiment, the shaft 1 is also magnetized by the ring-like permanent magnet 4, and the magnetic fluid can more surely be held on the bearing surfaces of the bearings 3a, 3b. Moreover, when the bearings 3a, 3b are also made of a magnetic material, also the bearings 3a, 3b are magnetized similarly, and the magnetic fluid 5 can more surely be held on the bearing surfaces of the bearings 3a, 3b.

Accordingly, the spindle motor of the present invention, because of using the magnetic fluid 5 as lubricating oil, enclosing the same and being assembled by the above described method, can fill the interior of the bearing unit with the fluid in the state that it contains little air bubbles. Furthermore, the motor manufactured by the assembly method of the invention has no lowering of the bearing rigidity, since the bearing part is sufficiently filled with the magnetic fluid 5. In addition, the component having no repeatability of the axial shake is also small since no air bubbles exists in an oil film on the bearing surface, so that accurate rotation can be maintained. Furthermore, as the magnetic fluid holding permanent magnet is arranged between the bearings, the magnetic fluid does not leak to the outside of the bearing unit even when using the latter in an arbitrary attitude. Further, when the shaft and the bearing all made of a magnetic material are used, the bearing part is magnetized, and air bubbles are not caught in the magnetic fluid even during the rotation, so that stable rotation can be kept.

The present invention, as the enclosing of magnetic fluid and the assembling of a motor are easy, is suitable for motors enabling the mass production. More specifically, when assembling of motors in the mass production, permanent magnets 17 are previously arranged by the lot unit of 100 pieces or 1000 pieces, and on these permanent magnets, as shown in FIG. 4, motor members to which bearing units have been incorporated are set. Then, magnetic fluid 5 is enclosed by means of an automatic enclosing dispenser, and the above described motors can be assembled by the lot unit. Accordingly, when the assembly method of a spindle motor according to the invention is applied to mass production motors for use in magnetic disk drive devices or the like, unevenness in the magnetic fluid enclosed is hardly caused, and accurate rotation can be obtained.

Figure 6:
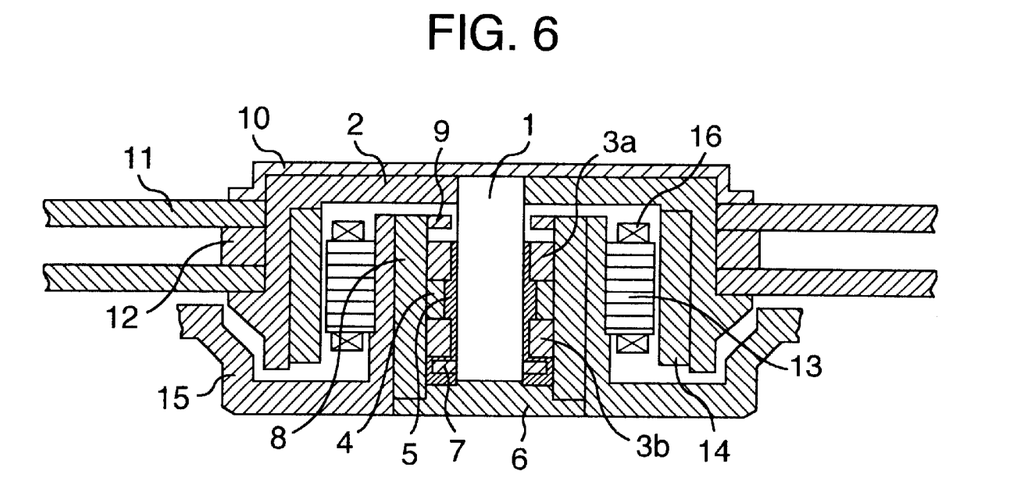
FIG. 6 is a vertical section view of a magnetic disk drive device to which the invention is applied.
Figure 7:
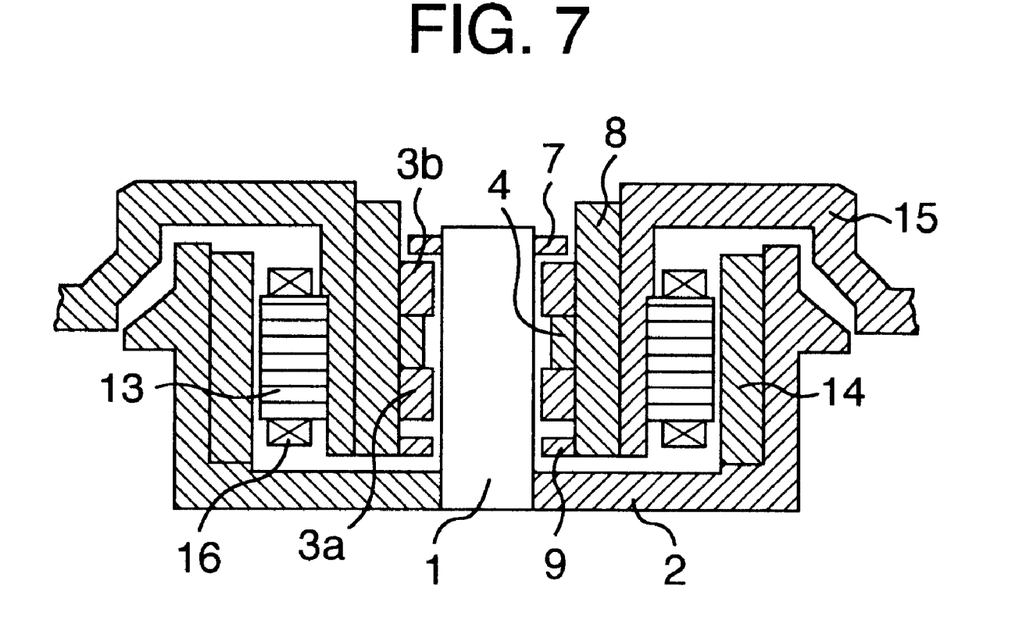
FIG. 7 is a vertical section view of a motor according to the invention before the enclosing of magnetic fluid.

FIG. 6 shows another embodiment of the invention, in which the structure of a motor is substantially the same as that of the embodiment in FIG. 1. It is different from the embodiment of FIG. 1 in that the slip-off stopper 7 is fitted on the end side of the shaft 1, and that the thrust bearing is assembled later. More specifically, in this embodiment, the bearing housing 8 is attached to the motor cover, and after that, in the bearing housing, the radial bearing 3b, the ring-like permanent magnet 4, the radial bearing 3a, and the cover 9 are assembled in order. Then, the rotary shaft 1 attached to the hub 2 is inserted through an opening on one side of the bearing housing. Subsequently, through an opening on the other side of the bearing housing 8, the slip-off stopper 7 is attached to the end of the shaft 1. After that, the external permanent magnet 17 is set to a part of the hub 2 with the shaft 1 as the center. FIG. 7 shows the state where the above described process has been finished. After the motor member has been set up to the state shown in FIG. 7, the thrust bearing is mounted to the motor member with the magnetic fluid 5 magnetically attracted on the thrust bearing.

Figure 8:
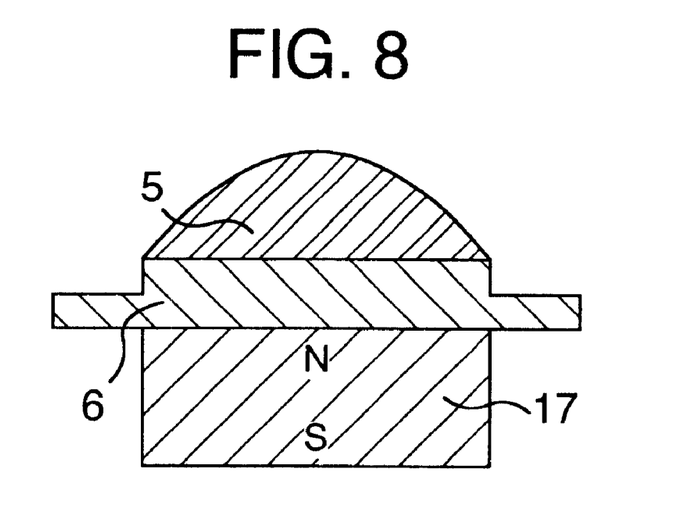
FIG. 8 is a vertical section view showing the state of magnetic fluid on a thrust bearing part.

More specifically, in this embodiment, as shown in FIG. 8, the permanent magnet 17 is put on the outer surface side of the thrust bearing 6, and the magnetic fluid 5 of a specified amount is supplied on the thrust bearing 6 by means of a dispenser. The magnetic fluid 5 thus supplied is held, as shown in FIG. 8, on the thrust bearing surface in the form of a substantially semi-sphere by the action of the magnet. In the state of FIG. 8, the thrust bearing 6 is mounted to the bearing housing 8 of the motor member shown in FIG. 7. At this time, the magnetic fluid 5 is filled in the space in the bearing unit while pressing out the air in the bearing unit to the cover 9 side, and similarly to the above described embodiment, it is possible to enclose the magnetic fluid 5 with substantially no residual air.

In this embodiment, similarly to the above described embodiment in FIG. 1, since the ring-shaped permanent magnet 4 for holding the magnetic fluid 5 is provided, when the permanent magnet 17 is removed in this state, the magnetic fluid 5 is held on the bearing surfaces of the bearings 3a, 3b while containing little air bubbles. Furthermore, when a shaft 1 made of a magnetic material is used as mentioned above, the shaft us also magnetized by the ring-like permanent magnet 4, and the magnetic fluid 5 can more surely be retained on the bearing surfaces of the bearings 3a, 3b. In addition, when the bearings 3a, 3b are also made of a magnetic material, the bearings 3a, 3b are also magnetized in a similar manner, and their bearing surfaces can contribute to the sure holding of the magnetic fluid 5. Accordingly, thanks to the function and effect similar to those of the above described embodiment, use of the spindle motor according to the invention as a spindle motor for magnetic disk drive devices or the like allows accurate rotation to be obtained.

Figure 9:
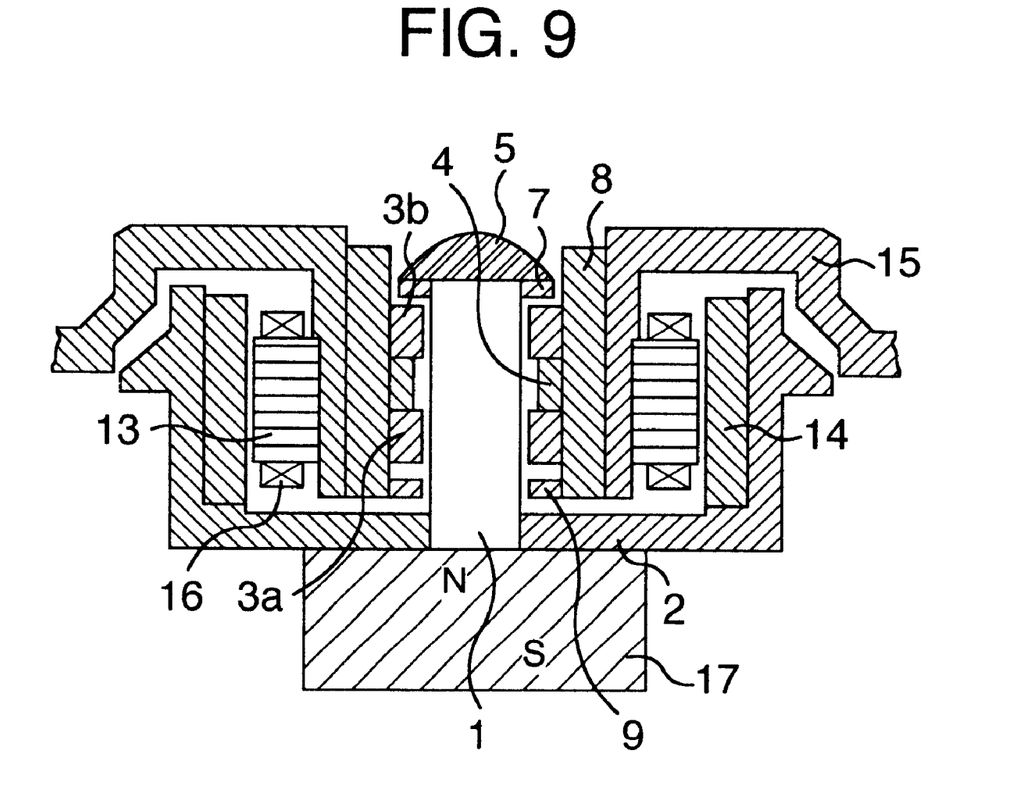
FIG. 9 is a view for explanation of the enclosing method of magnetic fluid according to the invention.

FIG. 9 shows a section view of another embodiment.

In the above embodiment of FIG. 6, the external permanent magnet 17 for temporarily holding the magnetic fluid is provided on the thrust bearing side. In this embodiment, the rotary shaft 1 is made of a magnetic material, and the external permanent magnet 17 for temporarily retaining the magnetic fluid is disposed at an outer portion of the hub 2 corresponding to the shaft 1 that is fixed to the hub. Besides, the order of assembling is almost the same as that of the embodiment in FIG. 6. As shown in FIG. 9, in this embodiment, two pairs of radial bearings 3a, 3b are arranged in the bearing housing 8, ring-like, bearing part permanent magnets 3a, 3b are arranged between the radial bearings, and then an assembly, in which the shaft 1, the driving motor rotor 14, disks, etc., not shown in the figure, are assembled to the hub 2, is inserted into the bearing housing 8 to close the one side of the bearing by the shaft 1 and the hub 2. After that, the slip-off stopper 7 is attached to the end of the shaft 1, and then, the external permanent magnet 17 is provided.

Figure 10:
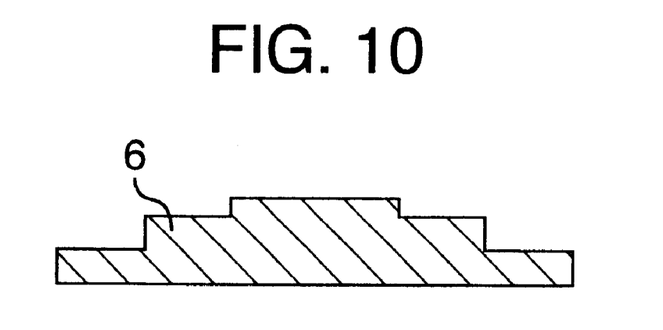
FIG. 10 is a vertical section view of a thrust bearing.

Subsequently, by means of a pipette or the like, magnetic fluid of a specified amount is temporarily held on the end of the shaft 1 and on the slip-off stopper 7. After that, the thrust bearing 6 shown in FIG. 10 is assembled. By this assembly method, similar action and effect to those of the embodiment in FIG. 6 are obtained.

Figure 11:
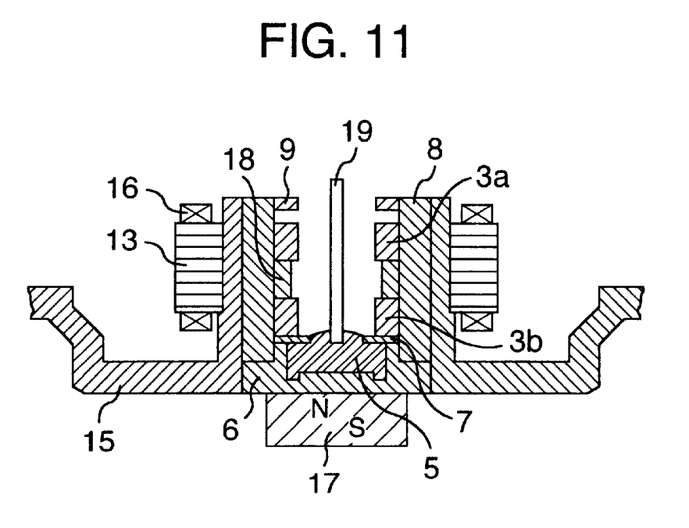
FIG. 11 is a view for explanation of the enclosing method of magnetic fluid according to the invention.

FIG. 11 shows another embodiment of the invention, in which the structure of the motor is the same as that of the embodiment of FIG. 1. A difference is that construction in which no permanent magnet is used between the bearings 3a, 3b and a spacer 18 made of metal or plastic is arranged. Accordingly, the order of assembling is approximately the same as that shown in FIG. 4 and FIG. 5. That is, normally, in the case where magnetic fluid is used for lubrication of the bearing, a bearing unit to which the sealing function is given by combining magnetic fluid and a permanent magnet is constructed. That is, when normal lubricating oil is used, in the motor formed by the conventional assembling method, enclosing of the lubricating oil is troublesome, and air bubbles may exist in the lubricating oil. According to the invention, magnetic fluid is used as lubricating oil, and it is possible to easily enclose the magnetic fluid 5 with only little residual air therein.

Figure 12:
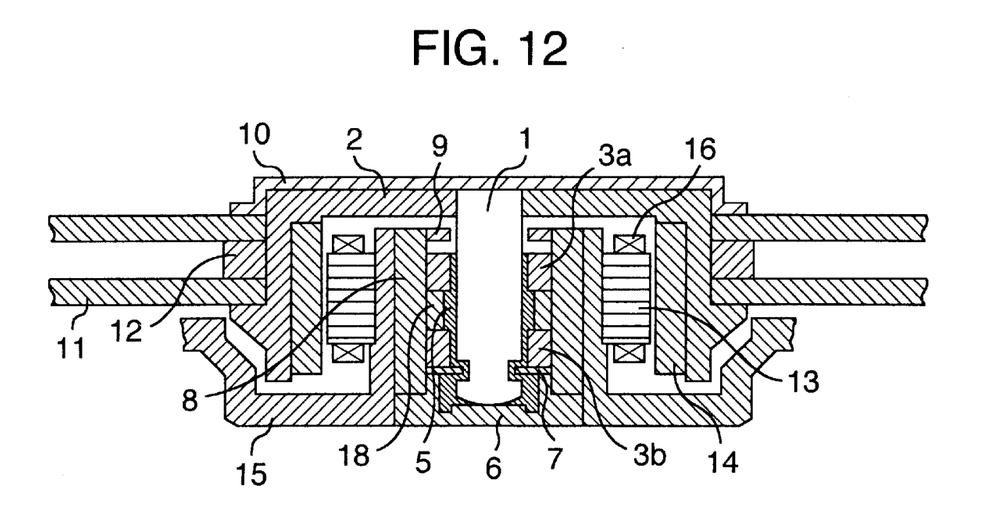
FIG. 12 is a vertical section view of the magnetic disk drive device to which the invention is applied.

More specifically, explaining this with reference to FIGS. 11 and 12, magnetic fluid is used for lubrication of the bearing. And, as shown in FIG. 11, the permanent magnet 17 is used for enclosing the magnetic fluid 5, and the magnetic fluid 5 of a specified amount is poured by means of a dispenser 19. Then, as shown in FIG. 12, when the shaft 1 is inserted into the bearing unit, the magnetic fluid 5 is pressed up to the cover 9 side. At this moment, the air in the interior of the bearing is also pressed out to the cover 9 side, and as the magnetic fluid 5 is magnetized by the permanent magnet 17, air bubbles, which are smaller in specific gravity than the magnetic fluid, are discharged, so that substantially no air bubbles remain in the magnetic fluid 5. When the permanent magnet 17 is removed in this state, the magnetic fluid 5 is held on the bearing surfaces of the bearings 3a, 3b with only little air bubbles contained therein. Then, the magnetic disk 11, the spacer 12, and the damper 10 are attached. By such a motor assembling method, similar function and effect to those of the above described embodiments can be attained.

Besides, although each of the embodiments described above has the construction in which the two radial bearings are disposed axially, it goes without saying that the assembly method according to the invention can be applied also to a bearing that is provided with no permanent magnet and no spacer and has only one radial bearing. Furthermore, the embodiments have been described giving an example of a spindle motor for a magnetic disk device in which disks are secured to the hub, but it goes without saying that the invention can also be applied to a spindle motor for a disk drive using an replaceable type disk such as an optical disk.

As having described above, use of the motor assembling method according to the invention allows a motor to be used in the state of sure lubrication. Accordingly, not only it becomes possible to perform precise rotation and high speed rotation of a spindle motor used in a magnetic disk device, an optical disk device or the like, but also it becomes possible to attain the improvement of the life, reliability or the like. Furthermore, the improvement in the mass productivity and a cost down can be attained.

By the motor assembling method according to the invention, as described above, magnetic fluid is used as lubricating oil, a permanent magnet is used, and it is possible to hold the magnetic fluid of a specified amount in the bearing unit by the magnetic attraction force and to fill and retain the magnetic fluid in the bearing part by means of the magnetic attraction force and by the surface tension in the bearing space. Accordingly, the motor, to which the motor assembling method according to the invention is applied, can be used in the state of sure lubrication. Therefore, when it is applied to a spindle motor for use in magnetic disk devices, optical disk devices or the like, not only the precise rotation and high speed rotation becomes possible but also the improvement in the life and reliability can be attained. Furthermore, the magnetic fluid used as lubricating oil can surely and easily be enclosed in the bearing part, and therefore, as mentioned above, the lot production is enabled, and the improvement in the mass productivity and a reduction of the cost can be attained.

What is claimed is:

1. A method of assembling a motor using a plain bearing unit, comprising the steps of:

arranging two radial bearings and a ring-shaped bearing part permanent magnet between the radial bearings from an opening side of a non-magnetic bearing housing, and arranging a thrust bearing to close an opening on one side of the bearing housing;

arranging an external permanent magnet on an outside corresponding to a thrust bearing part of the housing;

pouring lubricating magnetic fluid of a specified amount into the thrust bearing part from an opening on the other side of the bearing housing;

incorporating a shaft, which has a rotary member of a motor and is to be rotatably supported by the radial bearings and the thrust bearing, from the opening on the other side of the bearing housing; and removing the external permanent magnet arranged outside the housing.

2. A method of assembling a motor using a plain bearing unit, comprising the steps of:

arranging two radial bearings and a ring-shaped bearing part permanent magnet between the radial bearings from an opening of a non-magnetic bearing housing;

incorporating a shaft, which has a rotary member of a motor, between the radial bearings in the bearing housing to close an opening on one side of the bearing housing;

providing an external permanent magnet on an outside surface of a member forming a thrust bearing;

pouring lubricating magnetic fluid of a specified amount on a thrust bearing side;

attaching the thrust bearing to an opening on the other side of the bearing housing; and removing the external permanent magnet.

3. A method of assembling a motor using a plain bearing unit, comprising the steps of:

arranging a radial bearing and a thrust bearing from an opening on one side of a non-magnetic bearing housing;

arranging an external permanent magnet on an outer side of the thrust bearing;

pouring lubricating magnetic fluid of a specified amount into a thrust bearing part from an opening side on the other side of the bearing housing;

incorporating a shaft, which has a rotary member of a motor and is to be rotatably supported by the radial bearing and the thrust bearing, in an opening on the other side of the bearing housing; and removing the external permanent magnet.

4. A method of assembling a motor using a plain bearing unit, comprising the steps of:

arranging two radial bearings and a ring-shaped bearing part permanent magnet between the radial bearings from an opening of a non-magnetic bearing housing;

incorporating a shaft, which has a rotary member including a hub of a motor and is made of a magnetic material, between the radial bearings to close an opening on one side of the bearing housing;

attaching a stopper member to an end of the shaft from an opening on the other side of the bearing housing;

arranging an external permanent magnet for temporarily holding magnetic fluid at a part where the shaft of the hub is fixed;

pouring lubricating magnetic fluid of a specified amount to an end of the shaft from the opening on the other side of the bearing housing; and attaching a thrust bearing to the opening on the other side of the bearing housing.

* * * * *